US007680770B1

(12) United States Patent
Buyukkokten et al.

(10) Patent No.: US 7,680,770 B1
(45) Date of Patent: Mar. 16, 2010

(54) AUTOMATIC GENERATION AND RECOMMENDATION OF COMMUNITIES IN A SOCIAL NETWORK

(75) Inventors: Orkut Buyukkokten, Mountain View, CA (US); Adam Douglas Smith, Mountain View, CA (US)

(73) Assignee: Google Inc., Mountain View, CA (US)

( * ) Notice: Subject to any disclaimer, the term of this patent is extended or adjusted under 35 U.S.C. 154(b) by 344 days.

(21) Appl. No.: 10/948,710

(22) Filed: Sep. 23, 2004

Related U.S. Application Data

(60) Provisional application No. 60/536,615, filed on Jan. 21, 2004.

(51) Int. Cl.
*G06F 17/28* (2006.01)
*G06F 7/00* (2006.01)
*G06F 17/30* (2006.01)

(52) U.S. Cl. .................... 707/3; 704/9; 707/5; 707/6
(58) Field of Classification Search .................. 707/5, 707/6; 704/9; 706/48, 54, 55
See application file for complete search history.

(56) References Cited

U.S. PATENT DOCUMENTS

| 6,081,830 | A * | 6/2000 | Schindler .............. 709/204 |
|---|---|---|---|
| 6,185,559 | B1 | 2/2001 | Brin et al. |
| 6,256,648 | B1 | 7/2001 | Hill et al. |
| 6,285,999 | B1 | 9/2001 | Page |
| 6,389,372 | B1 | 5/2002 | Glance et al. |
| 6,526,440 | B1 | 2/2003 | Bharat |
| 6,529,903 | B2 | 3/2003 | Smith et al. |
| 6,594,673 | B1 | 7/2003 | Smith et al. |
| 6,615,209 | B1 | 9/2003 | Gomes et al. |
| 6,658,423 | B1 | 12/2003 | Pugh et al. |
| 6,678,681 | B1 | 1/2004 | Brin |
| 6,725,259 | B1 | 4/2004 | Bharat |
| 6,754,873 | B1 | 6/2004 | Law et al. |
| 7,069,308 | B2 * | 6/2006 | Abrams .................. 709/218 |
| 2002/0042791 | A1 | 4/2002 | Smith et al. |
| 2002/0116458 | A1 * | 8/2002 | Bricklin et al. ........... 709/204 |
| 2002/0116466 | A1 | 8/2002 | Trevithick et al. |
| 2002/0123988 | A1 | 9/2002 | Dean et al. |
| 2002/0124053 | A1 | 9/2002 | Adams et al. |

(Continued)

FOREIGN PATENT DOCUMENTS

JP 11265369 9/1999

(Continued)

OTHER PUBLICATIONS 1704 definition of "well-defined" available at: http://www.merriam-webster.com/dictionary/well-defined.*

(Continued)

*Primary Examiner*—Charles Rones
*Assistant Examiner*—Harold A Hotelling
(74) *Attorney, Agent, or Firm*—Fenwick & West LLP

(57) ABSTRACT

Systems and methods for automatic generation and recommendation of communities in a social network or set forth. According to one embodiment a method comprising accessing a group of profiles in a social network, identifying a match between entries in at least two profiles within the group of profiles, and determining a community based at least in part on the match is set forth.

28 Claims, 5 Drawing Sheets

U.S. PATENT DOCUMENTS

| | | | |
|---|---|---|---|
| 2002/0133481 | A1 | 9/2002 | Smith et al. |
| 2003/0050977 | A1* | 3/2003 | Puthenkulam et al. ...... 709/204 |
| 2004/0042599 | A1 | 3/2004 | Zaner et al. |
| 2004/0059708 | A1 | 3/2004 | Dean et al. |
| 2004/0088325 | A1 | 5/2004 | Elder et al. |
| 2004/0119740 | A1 | 6/2004 | Chang et al. |
| 2004/0122803 | A1 | 6/2004 | Dom et al. |
| 2004/0122811 | A1 | 6/2004 | Page |
| 2004/0148275 | A1* | 7/2004 | Achlioptas ...................... 707/3 |
| 2004/0249811 | A1* | 12/2004 | Shostack et al. ............... 707/5 |
| 2004/0260781 | A1* | 12/2004 | Shostack et al. ............ 709/207 |

FOREIGN PATENT DOCUMENTS

| | | |
|---|---|---|
| JP | 2002132604 | 5/2002 |
| WO | WO 0068860 | 11/2000 |

OTHER PUBLICATIONS

Amazon.com, "Feedback FAQ" web page at http://www.amazon.com/exec/obidos/tg/browse/-/1161284/gid=1091110289/sr=1-1/002-2, as available via the Internet and printed on Jul. 29, 2004.

ebay, "What is eBay?" web page at http://pages.ebay.com/help/welcome/questions/about-ebay.html, as available via the Internet and printed on Jul. 29, 2004.

ebay, Bidding on Items, "How to Bid" web page at http://pages.ebay.com/help/welcome/bid.html, as available via the Internet and printed on Jul. 29, 2004.

ebay, First Time Seller, "How to Sell" web page at http://pages.ebay.com/help/welcome/sell.html, as available via the Internet and printed on Jul. 29, 2004.

Amazon.com: Help, "Selling at Amazon Marketplace" web page at http://www.amazon.com/exec/obidos/tg/browse/-/1161234/ref=hp_hp_Is_4_2/002-283572, as available via the Internet and printed on Jul. 29, 2004.

Amazon.com: Help, "New Seller FAQ" web page at http://www.amazon.com/exec/obidos/tg/browse/-/1161274/002-2835726-5513622, as available via the Internet and printed on Jul. 29, 2004.

Amazon.com, "How to get a Great Feedback Score" web page at http://www.amazon.com/exec/obidos/tg/browse/-13107471/gid=1091110, as available via the Internet and printed on Jul. 29, 2004.

ebay services, "Frequency Asked Questions" web page at http://pages.ebay.com/help/basics/faq.html, as available via the Internet and printed on Jul. 29, 2004.

Amazon.com, "Friends and Favorites" web page at www.amazon.com/exec/obidos.subst/community/community-home.html, as available via the Internet and printed on Feb. 27, 2004.

Amazon.com: Help, "Wish List" web page at www.amazon.com/exec/obidos/tg/browse/-/897204/ref=ya_hp_reg_1/002-9880811-, as available via the Internet and printed on Feb. 18, 2004.

Amazon.com: Help. "Purchase Circles," web page at www.amazon.com/exec/obidos/tg/browse/-/468604/ref=cm_pc_faq/002-0759267-82, as available via the Internet and printed on Feb. 27, 2004.

"Accounts Website," web page at http://www.cs.rice.edu/-ssiyer/accounts/, as available via the Internet and printed on Jul. 29, 2004.

Microsoft Corporation, "Is Friendster the 'Next Big Thing'?" web page at http://mobilemomentum.msn.com/article.aspx?aid=4, as available via the Internet and printed on Jul. 29, 2004.

"Running Notes From Revenge of the User: Lessons from Creator/User Battles," web page at http://craphound.com/danahetcon04.txt, as available via the Internet and printed on Jul. 28, 2004.

Adamic, Lada et al., "A Social Network Caught in the Web," web page at http://firstmonday.org/issues/issue8_6/adamic/, as available via the Internet and printed on Jul. 28, 2004.

Multiply, "Multiply Privacy Policy," web page at http://multiply.com/info/privacy as available via the Internet and printed on May 3, 2004.

Multiply, "Multiply Terms of Service," web page at http://multiply.com/info/tos, as available via the Internet and printed on May 3, 2004.

Multiply, "Help," web page at http://multiply.com/info/help, as available via the Internet and printed on May 3, 2004.

Multiply, "About Multiply," web page at http://multiply.com/info/about, as available via the Internet and printed on May 3, 2004.

Sullivan, Danny, "Is It Really Personalized Search?," web page at http://searchengine.watch.com, as available via the Internet and printed on May 13, 2004.

Tribe.net, "Listings Directory," web page at http://www.tribe.net/tribe/servlet/template/pub.Listings.vm, as available via the Internet and printed on Jun. 28, 2004.

* cited by examiner

AUTOMATIC GENERATION AND RECOMMENDATION OF COMMUNITIES IN A SOCIAL NETWORK

RELATED APPLICATIONS

This application claims the benefit of the U.S. provisional application, application No. 60/536,615, entitled "Methods and Systems for Automatic Generation and Recommendation of Communities in a Social Network" filed Jan. 21, 2004, which is hereby incorporated by this reference.

FIELD OF THE INVENTION

The invention generally relates to social networks. More particularly, the invention relates to methods and systems for the automatic generation and recommendation of communities in a social network.

BACKGROUND

Conventional websites such as those hosted on Yahoo!™, Tribe™, Tickle™, or other web sites, allow users to form communities and groups. The communities and groups on conventional websites allow members of the group to communicate with each other and list announcements associated with the community. Generally, conventional web sites do not participate in creating or recommending groups or communities to users. Such conventional websites typically rely entirely on users to set up and create the communities and do not facilitate or automate the creation of communities. Additionally, conventional websites do not automatically recommend communities to potentially interested users.

SUMMARY

Embodiments of the present invention comprise systems and methods that improve social networking. One aspect of one embodiment of the present invention comprises accessing a group of profiles in a social network; identifying a match between entries in at least two profiles within the group of profiles, and determining a community based at least in part on the match. Further features and advantages of the present invention are set forth below.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Introduction

Embodiments of the present invention comprise methods and systems for the automatic generation and recommendation of communities in a social network. There are multiple embodiments of the present invention. By way of introduction and example, one exemplary embodiment of the present invention, provides a method for automatically identifying common characteristics among profiles within a social network, forming a community based on the common characteristics, and inviting members to then join the community.

This introduction is given to introduce the reader to the general subject matter of the application. By no means is the invention limited to such subject matter. Exemplary embodiments are described below.

System Architecture

Figure 1:
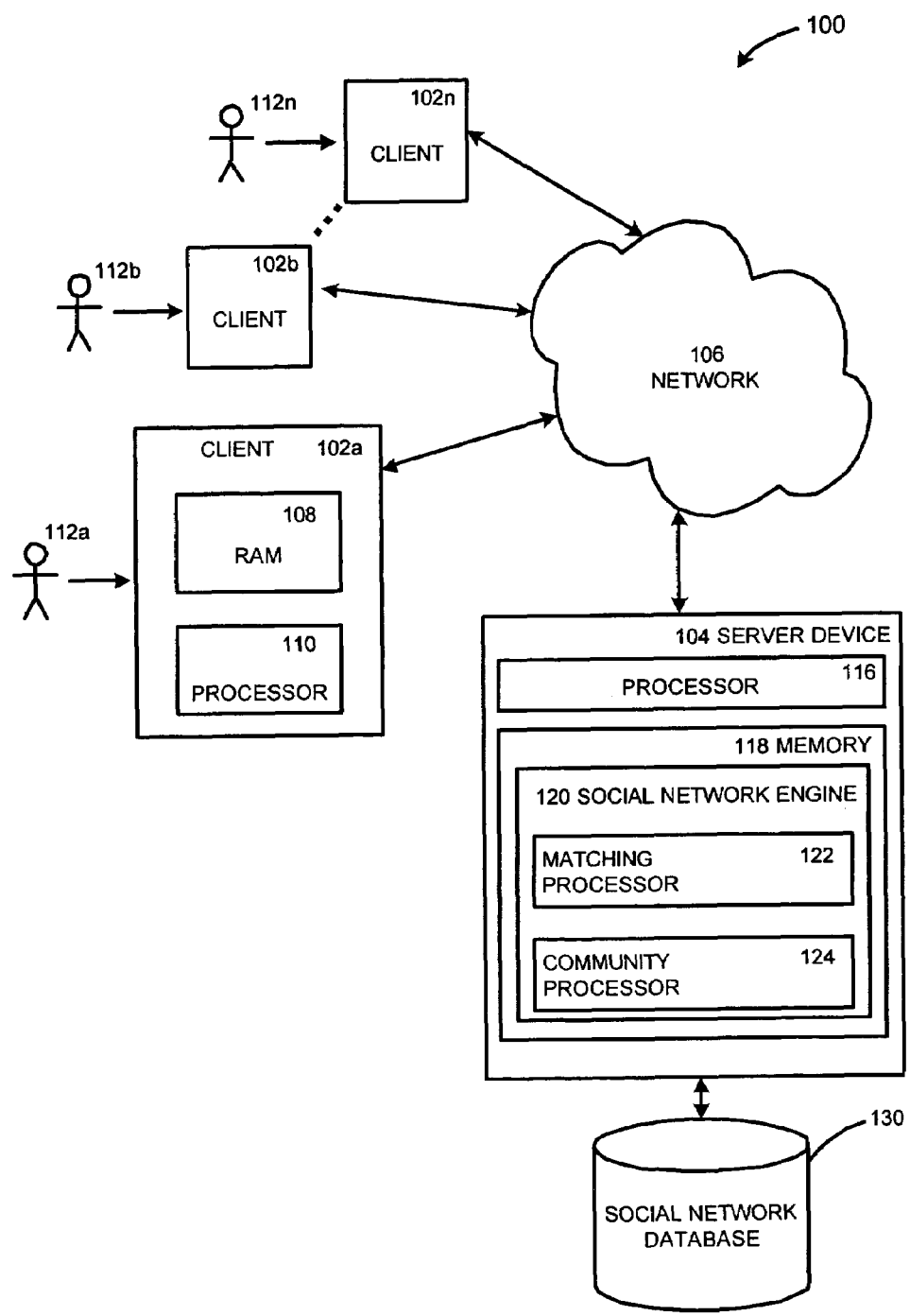
FIG. 1 illustrates a diagram of a system in accordance with one embodiment of the present invention.

Various systems in accordance with the present invention may be constructed. FIG. 1 is a diagram illustrating an exemplary system in which exemplary embodiments of the present invention may operate. The present invention may operate, and be embodied in, other systems as well.

Referring now to the drawings in which like numerals indicate like elements throughout the several figures, FIG. 1 is a diagram illustrating an exemplary environment for implementation of an embodiment of the present invention. The system 100 shown in FIG. 1 comprises multiple client devices 102*a-n* in communication with a server device 104 over a network 106. In one embodiment, the network 106 shown comprises the Internet. In other embodiments, other networks, such as an intranet, WAN, or LAN may be used. Moreover, methods according to the present invention may operate within a single computer.

The client devices 102*a-n* shown in FIG. 1 each comprises a computer-readable medium, such as a random access memory (RAM) 108 coupled to a processor 110. The processor 110 executes computer-executable program instructions stored in memory 108. Such processors may comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102*a*, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102*a-n* may also comprise a number of external or internal devices such as a mouse, a CD-ROM, DVD, a keyboard, a display, or other input or output devices. Examples of client devices 102*a-n* are personal computers, digital assistants, personal digital assistants, cellular phones, mobile phones, smart phones, pagers, digital tablets, laptop computers, Internet appliances, and other processor-based devices. In general, a client device 102*a* may be any type of processor-based platform that is connected to a network 106 and that interacts with one or more application programs. Client devices 102*a-n* may operate on any operating system capable of supporting a browser or browser-enabled application, such as Microsoft® Windows® or Linux. The client devices 102a-n shown can include, for example, personal computers executing a browser application program such as Microsoft Corporation's Internet Explorer™, Netscape Communication Corporation's Netscape Navigator™, and Apple Computer, Inc.'s Safari™.

Through the client devices 102a-n, users 112a-n can communicate over the network 106 with each other and with other systems and devices coupled to the network 106. As shown in FIG. 1, a server device 104 is also coupled to the network 106.

The server device 104 shown comprises a server executing a social network engine application program, also known as a social network engine 120. The social network engine 120 allows users, such as user 112a, to interact with and participate in a social network. A social network can refer to a computer network connecting entities, such as people or organizations, by a set of social relationships, such as friendship, co-working, or information exchange. Of course, a social network can refer to a computer application or data connecting such entities by such social relationships. Examples of social networks include Orkut.com and Friendster.com.

Social networks can comprise any of a variety of suitable arrangements. An entity or member of a social network can have a profile and that profile can represent the member in the social network. The social network can facilitate interaction between member profiles and allow associations or relationships between member profiles. Associations between member profiles can be one or more of a variety of types, such as friend, co-worker, family member, business associate, common-interest association, and common-geography association. Associations can also include intermediary relationships, such as friend of a friend, and degree of separation relationships, such as three degrees away.

Associations between member profiles can be reciprocal associations. For example, a first member can invite another member to become associated with the first member and the other member can accept or reject the invitation. A member can also categorize or weigh the association with other member profiles, such as, for example, by assigning a level to the association. For example, for a friendship-type association, the member can assign a level, such as acquaintance, friend, good friend, and best friend, to the associations between the member's profile and other member profiles. In one embodiment, the social network engine 120 can determine the type of association between member profiles, including, in some embodiments, the degree of separation of the association and the corresponding weight or level of the association.

Similar to the client devices 102a-n, the server device 104 shown comprises a processor 116 coupled to a computer-readable memory 118. The server device 104 is in communication with a social network database 130. Server device 104, depicted as a single computer system, may be implemented as a network of computer processors. Examples of a server device 104 are servers, mainframe computers, networked computers, a processor-based device, and similar types of systems and devices. Client processor 110 and the server processor 116 can be any of a number of computer processors, such as processors from Intel Corporation of Santa Clara, Calif. and Motorola Corporation of Schaumburg, Ill.

Each profile within a social network can contain entries, and each entry can comprise information associated with a profile. Examples of entries for a person profile can comprise contact information such as an email addresses, mailing address, IM name, or phone number; personal information such as relationship status, birth date, age, children, ethnicity, religion, political view, sense of humor, sexual orientation, fashion preferences, smoking habits, drinking habits, pets, hometown location, passions, sports, activities, favorite books, music, TV, or movie preferences, favorite cuisines; professional information such as skills, career, or job description; photographs of a person or other graphics associated with an entity; or any other information describing, identifying, or otherwise associated with a profile. Entries for a business profile can comprise industry information such as market sector, customer base, location, or supplier information; financial information such as net profits, net worth, number of employees, stock performance; or other types of information associated with the business profile.

The social network engine 120 comprises a matching processor 122 and community processor 124. The matching processor 122 can determine matches between entries in profiles. This may be accomplished by determining, for example, similar entries in a plurality of profiles. Once a match is determined, the matching processor 122 can pass the match to the community processor 124. The community processor 124 can determine communities within the social network based on the match received from the matching processor 122. The community processor can also invite profiles to associate with the community. Profiles can be invited to join the community based on entries within the profile that indicate a likely interest in the community. The communities created by the community processor 124 can facilitate communications between users and can encourage further associations between profiles.

Server device 104 also provides access to storage elements, such as a social network storage element, in the example shown in FIG. 1, a social network database 130. The social network database 130 can be used to store profiles and to store communities created by the community processor 124. Data storage elements may include any one or combination of methods for storing data, including without limitation, arrays, hash tables, lists, and pairs. Other similar types of data storage devices can be accessed by the server device 104. The social network engine 120 can receive data comprising the profiles and communities from the social network database 130 and can also send data comprising communities and profiles to the social network database 130 for storage. The social network database 130 may be physically attached or otherwise in communication with the social network engine 120 by way of a network or other connection.

It should be noted that the present invention may comprise systems having different architecture than that which is shown in FIG. 1. For example, in some systems according to the present invention, server device 104 may comprise a single physical or logical server. The system 100 shown in FIG. 1 is merely exemplary, and is used to help explain the social networks and methods illustrated in FIGS. 2-5.

Exemplary Social Network

Figure 2:
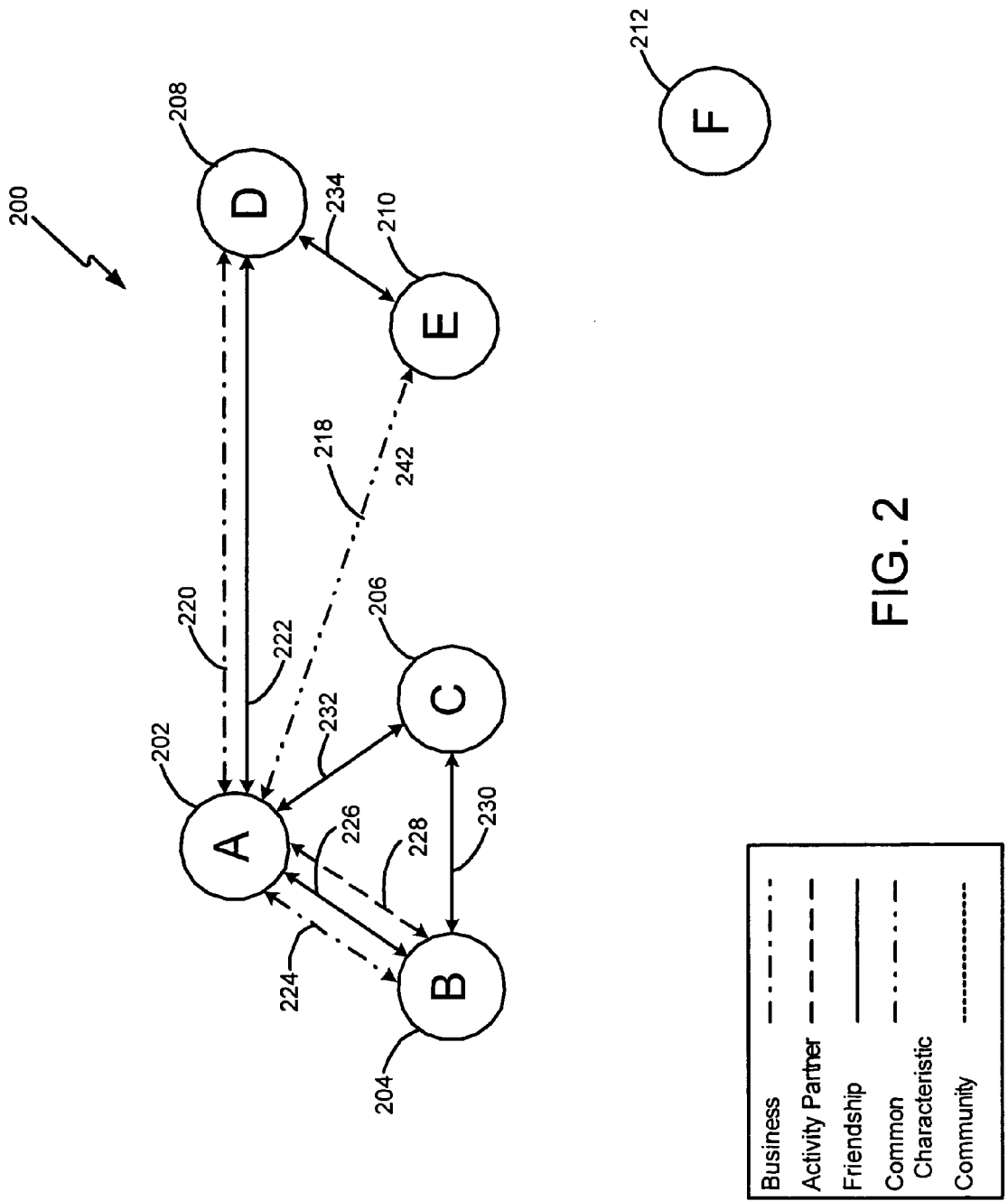
FIG. 2 illustrates one embodiment of a social network according to one embodiment of the present invention.

FIG. 2 shows a diagram of a social network 200 according to one embodiment of the present invention. According to the embodiment illustrated in FIG. 2, the social network 200 is illustrated with a graph comprising vertices 202, 204, 206, 208, 210, and 212 and edges 218, 220, 222, 224, 226, 228, 230, 232, and 234. The vertices 202, 204, 206, 208, 210, and 212 comprise profiles A, B, C, D, E, and F, respectively. Each profile can represent a member profile of a member of the social network 200. According to another embodiment, one or more of the vertices can represent a community. The methods and systems discussed below are equally applicable to an embodiment where the vertices comprise one or more communities, but for purposes of illustration, the vertices depicted in FIG. 2 represent member profiles. The exemplary network 200 shown in FIG. 2 has six members. Considerably more members can be part of the social network 200. A member can be an entity such as, for example, a person, an organization, a business, a corporation, a community, a fictitious person, or other suitable entity.

Each member profile can contain entries, and each entry can comprise information associated with a profile. For example, a person's member profile can contain: personal information, such as relationship status, birth date, age, children, ethnicity, religion, political view, sense of humor, sexual orientation, fashion preferences, smoking habits, drinking habits, pets, hometown location, passions, sports, activities, favorite books or music, TV or movie preferences, and favorite cuisines; contact information, such as email addresses, location information, instant messenger name, telephone numbers, and address; professional information, such as job title, employer, and skills; educational information, such as schools attended and degrees obtained, and any other suitable information describing, identifying, or otherwise associated with a person. A business' member profile can, for example, contain a description of the business, and information about its market sector, customer base, location, suppliers, net profits, net worth, number of employees, stock performance, contact information, and other types of suitable information associated with the business.

A member profile can also contain rating information associated with the member. For example, the member can be rated or scored by other members of the social network 200 in specific categories, such as humor, intelligence, fashion, trustworthiness, sexiness, and coolness. A member's category ratings can be contained in the member's profile. In one embodiment of the social network, a member can have fans. Fans can be other members who have indicated that they are "fans" of the member. Rating information can also include the number of fans of a member and identifiers of the fans. Rating information can also include the rate at which a member accumulated ratings or fans and how recently the member has been rated or acquired fans.

A member profile can also contain membership information associated with the member. Membership information can include information about a member's login patterns to the social network, such as the frequency that the member logs in to the social network and the member's most recent login to the social network. Membership information can also include information about the rate and frequency that a member profile gains associations to other member profiles. In a social network that comprises advertising or sponsorship, a member profile may contain consumer information. Consumer information may include the frequency, patterns, types, or number of purchases the member makes, or information about which advertisers or sponsors the member has accessed, patronized, or used.

A member profile may comprise data stored in memory. The profile, in addition to comprising data about the member, can also comprise data relating to others. For example, a member profile can contain an identification of associations or virtual links with other member profiles. In one embodiment, a member's social network member profile may comprise a hyperlink associated with another member's profile. In one such association, the other member's profile may contain a reciprocal hyperlink associated with the first member's profile. A member's profile may also contain information excerpted from another associated member's profile, such as a thumbnail image of the associated member, his or her age, marital status, and location, as well as an indication of the number of members with which the associated member is associated. In one embodiment, a member's profile may comprise a list of other social network members' profiles with which the member wishes to be associated.

An association may be designated manually or automatically. For example, a member may designate associated members manually by selecting other profiles and indicating an association that can be recorded in the member's profile. According to one embodiment, associations can be established by an invitation and an acceptance of the invitation. For example, a first user can send an invitation to a second user inviting the second user to form an association with the first user. The second user can accept or reject the invitation. According to one embodiment, if the second user rejects the invitation, a one-way association can be formed between the first user and the second user. According to another embodiment, if the second user rejects the association, no association may be formed between the two users. Also, an association between two profiles may comprise an association automatically generated in response to a predetermined number of common entries, aspects, or elements in the two members' profiles. In one embodiment, a member profile may be associated with all of the other member profiles comprising a predetermined number or percentage of common entries, such as interests, hobbies, likes, dislikes, employers and/or habits. Associations designated manually by members of the social network, or associations designated automatically based on data input by one or more members of the social network, can be referred to as user established associations.

Associations between profiles within a social network can be of a single type or can be multiple types and can include, for example, friendship associations, business associations, family associations, community associations, school associations, or any other suitable type of link between profiles. Associations can further be weighted to represent the strength of the association. For example, a friendship association can be weighted more than a school association. Each type of association can have various levels with different weights associated with each level. For example, a friendship association can be classified according to which of a plurality of friendship association levels it belongs to. In one embodiment, a friendship association may be assigned a level by the member from a list of levels comprising: a best friend, a good friend, a regular friend, an acquaintance, and a friend the member has not met.

In FIG. 2, the edges 218, 220, 222, 224, 226, 228, 230, 232, and 234 shown comprise associations between profiles. According to the embodiment shown in FIG. 2, the social network 200 comprises a plurality of differing types of associations represented by edges 218, 220, 222, 224, 226, 228, 230, 232, and 234. The types of associations shown in FIG. 2 for illustration purposes are business associations, activity partner associations, friendship associations, community associations, and common characteristic associations. Common characteristic associations may include, for example, associations based on some characteristic, such as attending the same high school or being from the same hometown, and can indicate a lower level of significance than another type of association, such as a friendship association.

Referring to FIG. 2, edge 220 and edge 222 each comprise an association between profile A at vertex 202 and profile D at vertex 208. The edge 220 represents a business association, and the edge 222 represents a friendship association. Profile A is also associated with profile E by a common characteristic association comprising edge 218. The association between profile A and profile E may be more attenuated than the association between profile A and D, but the association can still be represented by the social network depicted in FIG. 2.

Each member represented by the profiles A, B, C, D, E, and F comprising the vertices 202, 204, 206, 208, 210, and 212, respectively, for purposes of illustration, comprises a person. Other types of members can be in social network 200. For example, communities, special interest groups, organizations, political parties, universities, and legal persons, such as corporations and business partnerships may be members of the social network 200. The associations 218, 220, 222, 224, 226, 228, 230, 232, and 234 illustrated in FIG. 2 comprise bi-directional associations. An association between two profiles may comprise a bi-directional association when both parties to the association are associated with each other. For example, in FIG. 2, profile A is associated with profile D, and profile D is also associated with profile A. In one embodiment, profiles A and D will not be bi-directionally associated with each other until both profiles consent to such an association. For example, profile A may invite profile D to be associated therewith, and the bi-directional association occurs upon profile D's acceptance of such invitation. The invitation, for example, may include sending an email or other message to profile D indicating that profile A has requested an association with profile D.

Other embodiments of the present invention may comprise directed associations or other types of associations. Directed associations can associate a first profile with a second profile while not requiring the second profile to be associated with the first profile. For example, profile A can be associated by a friendship association with profile B, and profile B can be unassociated with profile A, or profile B can be associated with profile A through a different type of association, such as a business association. Thus a display of profile A's friends can include profile B, but a display of profile B's friends would not include profile A.

According to another embodiment, a directed or single direction association can be formed when one member indicates an association with a second member but the second member does not reciprocate the association. For example, a member associated with profile A can indicate that he is a friend of a member associated with profile B. The member associated with profile B in this example can decide not to indicate that the member associated with profile A is a friend. According to one embodiment, profile B would not be displayed with profile A's friends nor would profile A be displayed with profile B's friends as the association was not reciprocated by profile B. Similarly, profile B may not be included, for example, within a listing of friends of profile A for purposes of determining degrees of separation, for example. Thus, in such an embodiment, the displaying of profile B can be controlled by the associations the member associated with profile B assents to.

Within a social network, a degree of separation can be determined for associated profiles. In one embodiment, a degree of separation between two profiles can be determined by the fewest number of edges of a certain type separating the associated profiles. In another embodiment, a type-specific degree of separation may be determined. A type-specific degree of separation comprises a degree of separation determined based on one particular type of association. For example, a profile A has a friend association degree of separation of two from profile E. The fewest number of friendship associations between profile A and profile E is two—the friendship association comprising edge 222 between profiles A and D and the friendship association comprising edge 234 between profiles D and E. Thus, for the associated profiles A and E, the degree of friendship separation, determined according to one aspect of one embodiment of the present invention, is two.

Another type-specific degree of separation can also be determined for profiles A and E. For example, a common characteristic degree of separation can be determined by determining the fewest number of common characteristic associations separating profile A and profile E. According to the embodiment depicted in FIG. 2, there is one common characteristic association, comprising edge 218, separating profiles A and E. Thus, the common characteristic association degree of separation, according to the embodiment depicted in FIG. 2, is one. The common characteristic in this example can be that profile A attended the same high school as profile E. A common characteristic association may be selected by profiles A and E to represent that they are associated in some fashion, but to not create a close association, such as with a friendship association. A type-neutral degree of association can also be determined. A type-neutral degree of association can be determined by determining the fewest number of edges connecting two vertices, regardless of type.

According to other aspects of certain embodiments of the present invention, the degree of separation may be determined by use of a weighting factor assigned to each association. For example, close friendships can be weighted higher than more distant friendships. According to certain aspects of embodiments using a weighting factor, a higher weighting factor for an association can reduce the degree of separation between profiles and lower weighting factors can increase the degree of separation. This can be accomplished, for example, by establishing an inverse relationship between each association and a corresponding weighting factor prior to summing the associations. Thus, highly weighted associations would contribute less to the resulting sum than lower weighted associations.

Figure 3:
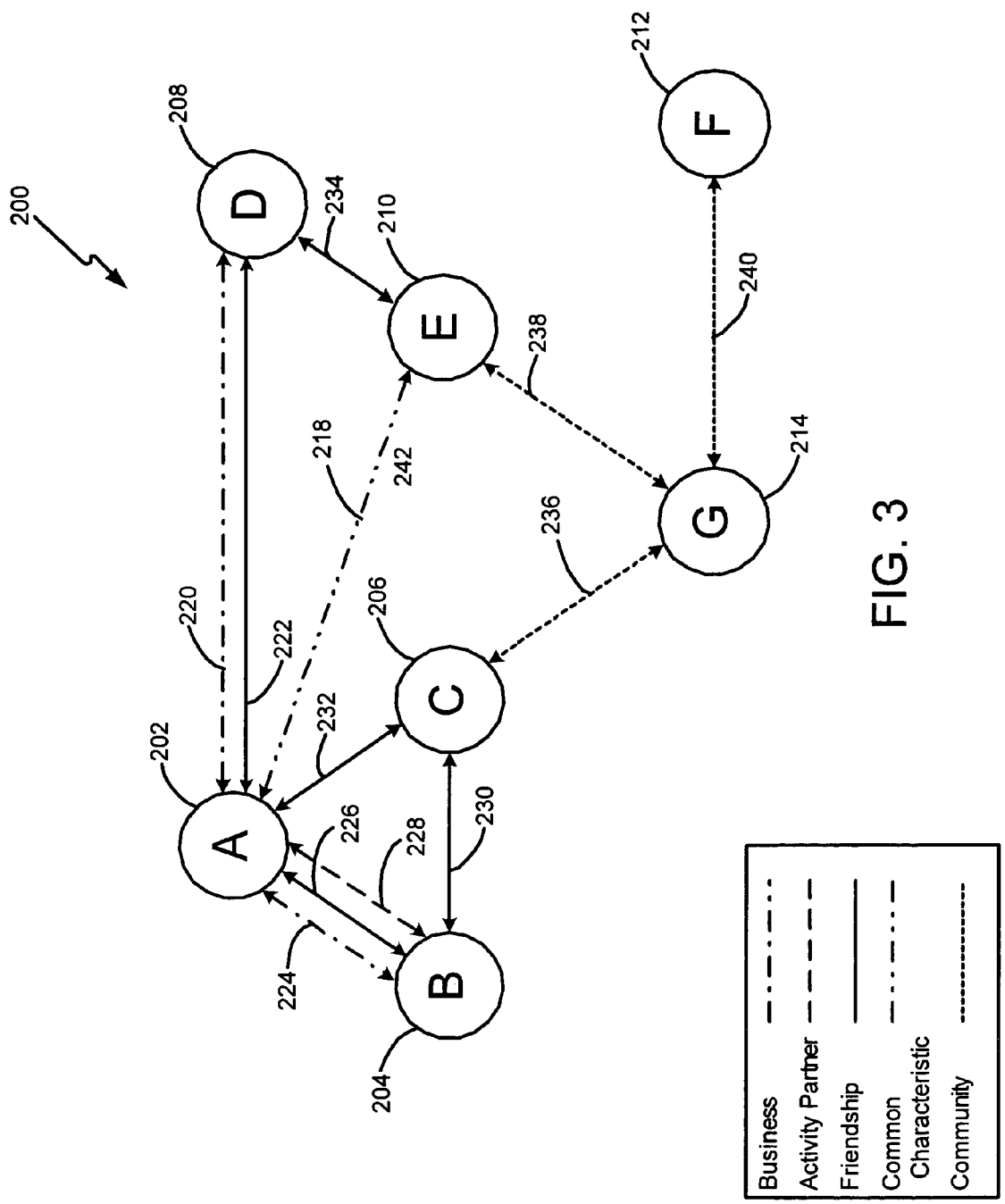
FIG. 3 illustrates another embodiment of a social network according to one embodiment of the present invention.

FIG. 3 shows another social network 200 according to one embodiment of the present invention. The social network illustrated in FIG. 3 is similar to the social network illustrated in FIG. 2 except the social network 200 illustrated in FIG. 3 comprises an additional profile G comprising an additional vertex 214 and additional associations comprising edges 236-240. The additional profile G, according to the social network 200 depicted in FIG. 3, represents a community. The community profile according to one embodiment comprises entries associated with a match between a plurality of profiles. For example, if profile C includes "hiking" for an activity entry, and profile E also includes "hiking" for an activity entry, a "hiking" community can be determined which corresponds to the match between profile C and profile E associated with "hiking." According to some aspects of some embodiments, an invitation to join the "hiking" community can be sent to profiles comprising entries indicating potential interest in the community. For example, according to the embodiment depicted in FIG. 3, profile F, comprising vertex 212, may also contain an entry "hiking" for an activity entry. Thus an invitation can be sent to profile F, and profile F can accept the invitation and be associated with community profile G. Thus, according to the embodiment depicted in FIG. 3, profiles C, E, and F can be associated with the community profile G by community associations comprising edges 236-240.

Figure 4:
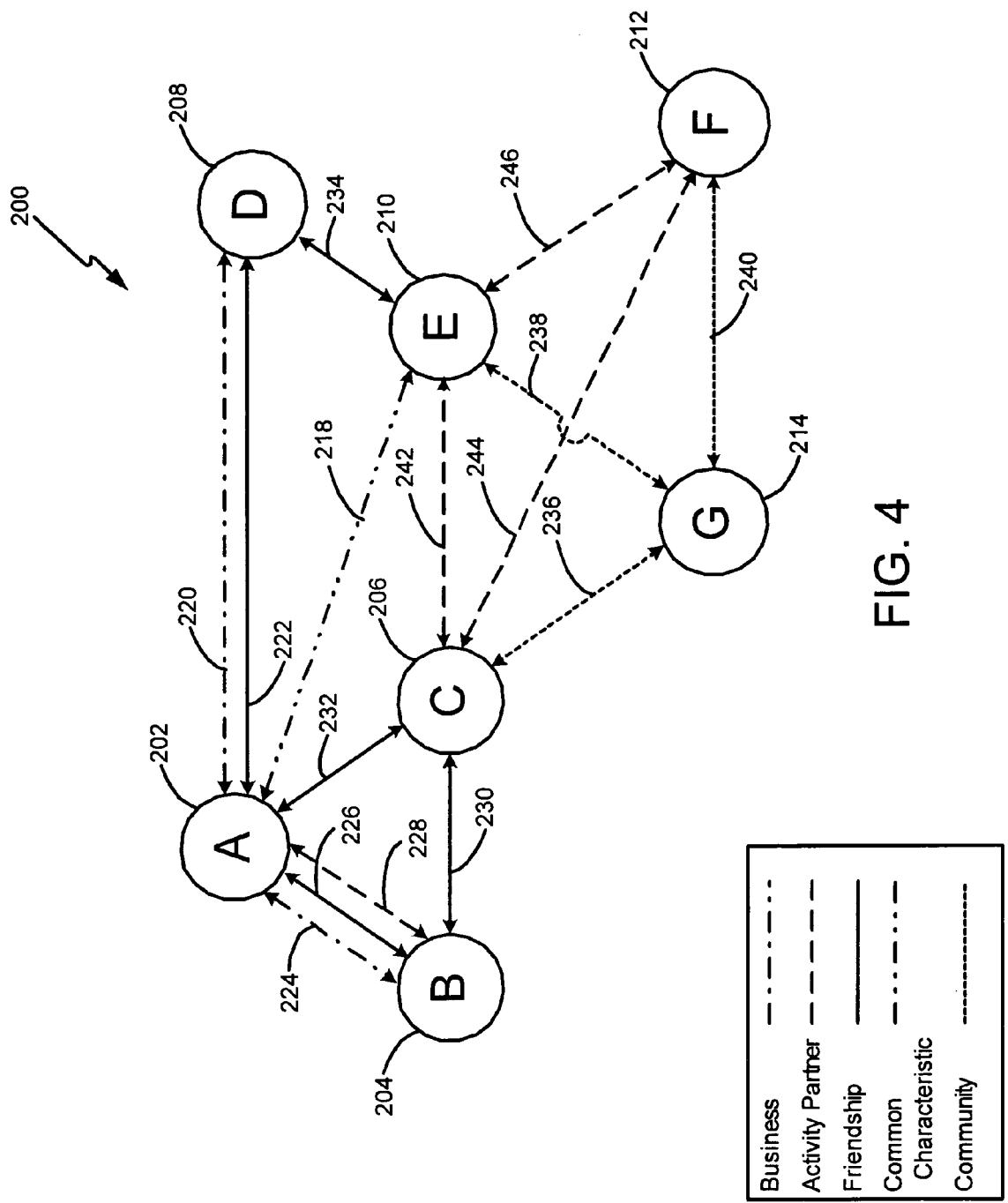
FIG. 4 illustrates another embodiment of a social network according to one embodiment of the present invention.

FIG. 4 illustrates yet another social network 200 in accordance with one embodiment of the present invention. The social network 200 depicted in FIG. 4 is similar to the social network depicted in FIG. 3 except the social network illustrated in FIG. 4 further comprises edges 242-246 representing activity partner associations between vertices 206, 210, and 212 which represent profiles C, E, and F respectively. According to the embodiment depicted in FIG. 4, users represented by profiles C, E, and F can have formed the activity partner associations subsequent to becoming acquainted with each other through the community represented by profile G.

Process

Various methods in accordance with the present invention may be carried out. One exemplary method according to the present invention comprises accessing a group of profiles in a social network; identifying a match between entries in at least two profiles in the group of profiles, and determining a community based at least in part on the match.

According to another embodiment, at least one profile can be invited to associate with the community. According to another embodiment identifying a match can comprise determining same or similar words within entries. According to another embodiment determining same or similar words can comprise one or more of concept clustering and ontological matching. According to another embodiment identifying the match can comprise searching for a predetermined type of entry or determining most common matches within entries. According to another embodiment, the group of profiles can comprise all of a social network, a subset of a social network, or at least two profiles within a social network.

In yet another embodiment, a method can comprise determining a community within a social network, identifying an entry associated with a profile indicating a likely interest in the community, and inviting the profile to associate with the community. According to another embodiment determining a community can comprise creating a new community. According to another embodiment the new community can be created for a predetermined objective. According to another embodiment determining a community can comprise identifying an existing community. According to another embodiment identifying an entry can comprise crawling the social network.

Figure 5:
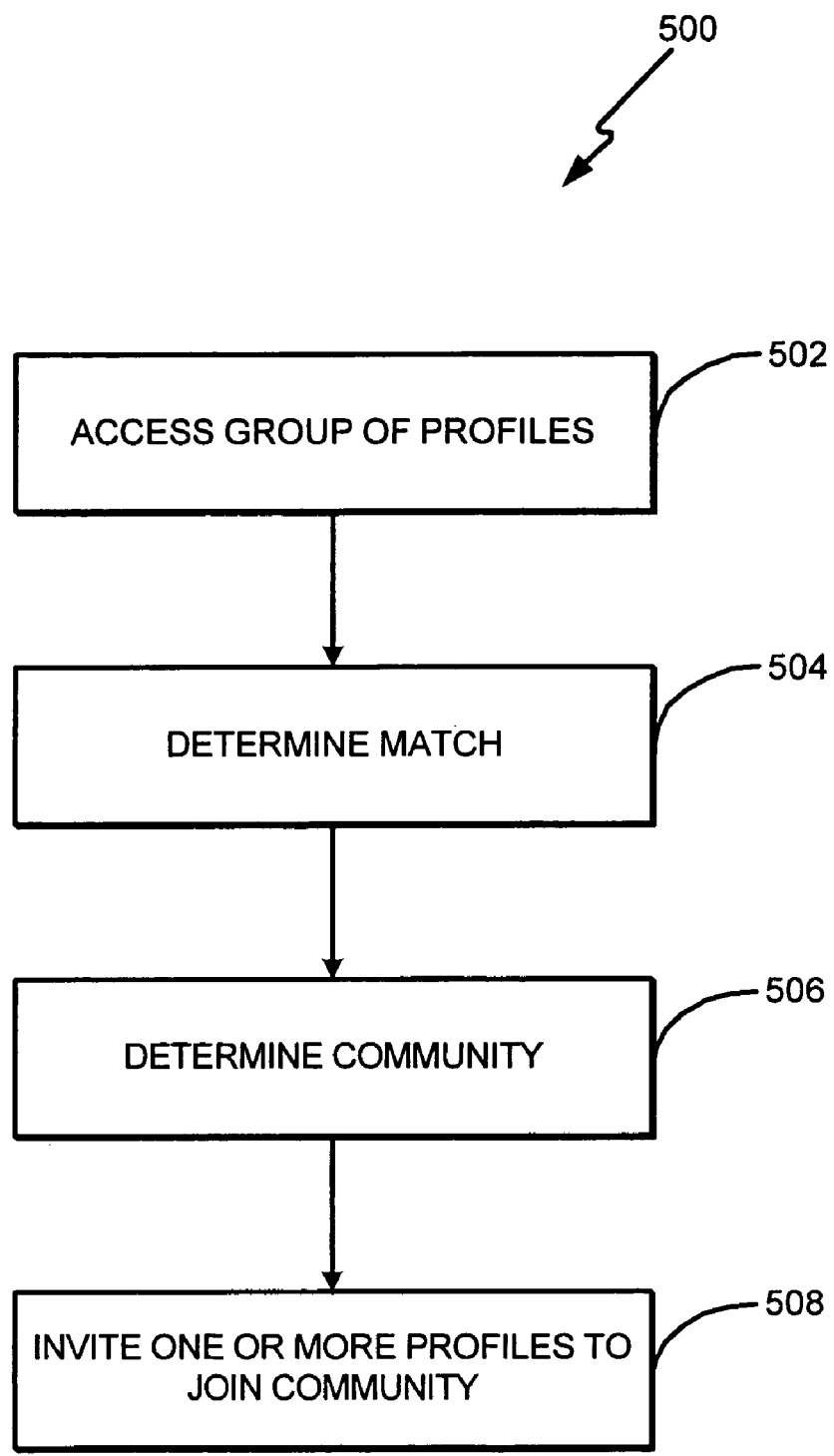
FIG. 5 illustrates a flow diagram of one embodiment of a method carried out by the present invention.

FIG. 5 illustrates a method 500 in accordance with one embodiment of the present invention. The method illustrated in FIG. 5 begins in block 502 wherein the matching processor accesses a group of files. The group of files can comprise all of the profiles in a social network, or a subset of all of the profiles. For example, the matching processor can access all people profiles, all organization profiles, all profiles containing entries corresponding to a certain location or a subset of profiles based on some other suitable criteria. The group of profiles may contain as few as two profiles.

After block 502, the method 500 proceeds to block 504 wherein the matching processor 122 identifies a match between entries within the group of profiles determined in block 502. The matching processor 122 can determine a match by determining same or similar words within entries. For example, the matching processor 122 may determine a match "hiking" out of a group of profiles containing the same activity entry "hiking." The matching processor 122 can also determine a match by searching entries within a profile for a predetermined type of entry. For example, the matching processor 122 may conduct a search to find all entries corresponding to a certain location. Additionally, the matching processor 122 can conduct a search to determine the most common matches appearing within the entries of profiles on a social network. The matching processor 122 can determine common entries by comparing individual words included in an entry, general categories of terms included in an entry, or general concepts. For example, the matching processor 122 can use concept clustering to determine matches. As an example of concept clustering, the matching processor can determine one entry in a profile to be "hiking" and another entry to be "backpacking" and can further determine that both of these entries correspond to the concept "outdoor exploring" and form a match based on this concept. The matching processor 122 can also use any other suitable method of determining similarities between entries in profiles.

The matching processor 122 can further identify matches by concept clustering or ontological matching. Concept clustering can comprise identifying common concepts relating different entries. For example, the matching processor can determine one entry in a profile to be "hiking" and another entry to be "backpacking" and can further determine that both of these entries correspond to a common concept "outdoor exploring" and form a match based on this concept.

Ontological matching can comprise, for example, identifying a concept or meaning associated with a word, term, or phrase and identifying another word, term, or phrases related to the concept or meaning. For example, ontological matching can comprise matching a plurality of concepts, which are connected to one another through many different types of relationships, such as, for example, "kind of", "has kind", "part of", "has part", "member of", "has member", "substance of", "has substance", "product of", and "has product". For example, the concept of "hiking" is connected to the concept of "outdoor sport" through a "kind of" connection. Thus, "hiking" is a "kind of" "outdoor sport". Similarly, "San Francisco" is a part of "California", thus "California" has part "San Francisco", and "California" is part of the "United States", and "United States" has part "California". Finally, the matching processor 122 can use any other suitable method of determining similarities between entries in profiles.

Once the matching processor determines a match, the method 500 proceeds to block 506, wherein the matching processor 122 passes the match to the community processor 124. The community processor then determines a community based at least in part on the match. The community may comprise a community profile that enables other profiles to associate with the community profile or with other profiles directly. For example, according to the social network depicted in FIG. 3, the community profile G associates profiles C, E, and F by way of community associations comprising edges 236-240. In this way the profiles C, E, and F are not directly associated with each other but are associated by way of the community profile. If, for example, the users represented by profiles C, E, and F determine that they want to associate directly with each other, they can do so by any type of desired association. This is illustrated by the social network depicted in FIG. 4 where profiles C and E, and F are associated directly with each other by edges 242-246 comprising, for example, activity partner associations.

The community may further comprise a web page wherein announcements, calendar information, contact information, ideas, topics, or other information associated with the community can be presented. The community may comprise distribution lists which facilitate communications between profiles such as email distribution lists, mailing lists, instant messaging lists, or telephone lists. According to alternative embodiments, a community can also be formed based on a predetermined objective independent of determining a match between at least two profiles in at least two entries. For example, a predetermined "dating" objective can be determined prior to identifying matching entries within profiles. The matching processor 122 can then crawl the social network to identify profiles containing entries that indicate a likely interest in a "dating" community. Predetermined objectives can be entered, for example, by an administrator or publisher of a social network, by one or more users of a social network, by advertisers, or by other suitable entities.

Once the community processor 124 determines a community, the method 500 proceeds to block 506, wherein one or more users associated with profiles on the network are invited to associate with the community by the social network engine 120. The social network processor 120 may invite users, for example, by sending an email to an email address contained in the profile corresponding to the user. The users selected to receive invitations to associate with the community, according to some embodiments, may comprise users associated with profiles containing entries from which the match in block 504 was determined.

According to other embodiments, the profiles invited to associate with the social network may comprise profiles containing an entry indicating a likely interest or other potential relationship with the community determined in block 506 or with the profiles containing the entries from which the match was determined. For example, if the match determined in block 504 was "performing improvisation comedy" and the community formed in block 506 was "improvisation comedians," then all profiles indicating an interest in performing improvisation comedy can be invited to join as well as profiles indicating, for example, a sense of humor disposed to enjoy watching improvisation comedy. Thus, the profiles to which the invitations are sent are not limited to the profiles from which the match was determined, but may extend to other profiles demonstrating a likely interest in the particular community. According to another embodiment, a community can first be determined and profiles can then be identified that contain entries indicating a likely interest in the community. Methods for identifying entries indicating a likely interest in a community include the methods discussed above of identifying same or similar words, concept clustering, ontological matching, and may also include other suitable methods.

According to one embodiment, the social network engine 120 can first determine a community by identifying an existing community or creating a new community, for example, and then crawl the social network to identify profiles that contain entries indicating a likely interest in the community. For example, the social network engine 120 can determine a dating community and then crawl the social network to identify profiles containing entries indicating an interest in dating. Entries indicating an interest in dating can include, for example, entries indicating a "single" status, a "interested in dating" status, a "looking for activity partner" status, age group indications, sexual preference indications, location information, or other suitable indications that a profile may be interested in dating. Once profiles associated with entries indicating a likely interest in a community are identified, according to one embodiment, an invitation can be sent to the profile inviting the profile to join the community.

A profile can accept an invitation to associate with the community, and a community association can exist between the profiles accepting the invitation and the community profile. For example, according to the social network depicted in FIG. 3, profiles, C, E, and F can have accepted invitations and formed associations with the community profile G. Profiles may then associate directly with other profiles associated with the community profile, as illustrated in the social network depicted in FIG. 4, where Profiles C, E, and F are associated by activity partner associations. Community profiles can therefore facilitate communication between profiles that are not otherwise associated, and community profiles can assist in forming additional direct associations between profiles.

While the above description contains many specifics, these specifics should not be construed as limitations on the scope of the invention, but merely as exemplifications of the disclosed embodiments. Those skilled in the art will envision any other possible variations that are within the scope of the invention.

What is claimed:

1. A computer-implemented method of generating a new defined community of users in a social network, comprising:
    storing a plurality of user profiles in a social network, each user profile including a plurality of entries associated with a corresponding user;
    identifying a match between entries within at least two profiles;
    automatically creating the new defined community based on the matched profiles in the absence of user communication about the new defined community, wherein the new defined community does not already exist in the social network, is distinct from other existing communities in the social network, and is distinct from identities of members of the new defined community;
    inviting each matched profile to join the new defined community;
    identifying additional profiles that demonstrate a likely interest in the new defined community; and
    inviting each identified additional profile to join the new defined community.

2. The method of claim 1, wherein the entries associated with a user comprise at least one of:
    contact information, personal information, professional information, graphics associated with the user, rating information, membership information, consumer information, and a list of other profiles with which the user is associated.

3. The method of claim 1, wherein identifying the match between entries within profiles comprises:
    identifying a plurality of types of associations between profiles, selected from the types comprising: friendship association, co-worker association, family association, business association, common-interest association, common-geography association, community association, school association, and intermediary relationships, wherein intermediary relationships include friend of a friend and degree of separation relationships.

4. The method of claim 3, wherein identifying associations between profiles comprises:
    determining a reciprocity between two profiles, a degree of separation between the two profiles, and a weight of the association between the two profiles.

5. The method of claim 4, wherein the degree of separation between the two profiles is based on a type-specific association between the two profiles.

6. The method of claim 4, wherein the degree of separation between the two profiles is based on a weighting factor assigned to each association between the two profiles.

7. The method of claim 1, wherein identifying the match between entries comprises:
    determining similar terms within the entries.

8. The method of claim 1, wherein identifying the match between entries comprises:
    concept clustering terms within the entries to one or more concepts.

9. The method of claim 1, wherein identifying the match between entries comprises:
    ontologically matching terms within the entries to an ontology.

10. The method of claim 1, wherein identifying the match between entries comprises:
    identifying at least one matching term within the entries.

11. The method of claim 1, wherein identifying the match between entries comprises:
    determining a most common match within the entries.

12. The method of claim 1, wherein identifying additional profiles that demonstrate a likely interest in the new defined community comprises:

crawling the social network for additional profiles; and
identifying a match between entries in each additional profile and entries in one or more profiles in the new defined community.

13. The method of claim 1, wherein identifying additional profiles that demonstrate a likely interest in the new defined community comprises:
crawling the social network for additional profiles; and
identifying a match between entries in each additional profile and concepts in one or more concept clusters.

14. A computer program product having a computer-readable medium having computer program instructions embodied therein for generating a new defined community of users in a social network, the computer program product comprising computer program instructions for:
storing a plurality of user profiles in a social network, each user profile including a plurality of entries associated with a corresponding user;
identifying a match between entries within at least two profiles;
automatically creating the new defined community based on the matched profiles in the absence of user communication about the new defined community, wherein the new defined community does not already exist in the social network, is distinct from other existing communities in the social network, and is distinct from identities of members of the new defined community;
inviting each matched profile to join the new defined community;
identifying additional profiles that demonstrate a likely interest in the new defined community; and
inviting each identified additional profile to join the new defined community.

15. The computer program product of claim 14, wherein the entries associated with a user comprise at least one of:
contact information, personal information, professional information, graphics associated with the user, rating information, membership information, consumer information, and a list of other profiles with which the user is associated.

16. The computer program product of claim 14, wherein identifying the match between entries within profiles comprises:
identifying a variety of types of associations between profiles, from the types comprising: friendship association, co-worker association, family association, business association, common-interest association, common-geography association, community association, school association, and intermediary relationships, wherein intermediary relationships include friend of a friend and degree of separation relationships.

17. The computer program product of claim 16, wherein identifying associations between profiles comprises:
determining a reciprocity between two profiles, a degree of separation between the two profiles, and a weight of the association between the two profiles.

18. The computer program product of claim 17, wherein the degree of separation between the two profiles is based on a type-specific association between the two profiles.

19. The computer program product of claim 17, wherein the degree of separation between the two profiles is based on a weighting factor assigned to each association between the two profiles.

20. The computer program product of claim 14, wherein identifying the match between entries comprises:
determining similar terms within the entries.

21. The computer program product of claim 14, wherein identifying the match between entries comprises:
concept clustering terms within the entries to one or more concepts.

22. The computer program product of claim 14, wherein identifying the match between entries comprises:
ontologically matching terms within the entries to an ontology.

23. The computer program product of claim 14, wherein identifying the match between entries comprises:
determining any word, term, or phrase; and
searching for the determined word, term, or phrase within the entries.

24. The computer program product of claim 14, wherein identifying the match between entries comprises:
determining the most common matches within the entries.

25. The computer program product of claim 14, wherein identifying additional profiles that demonstrate a likely interest in the new defined community comprises:
crawling the social network for additional profiles; and
identifying a match between entries in each additional profile and entries in one or more profiles in the new defined community.

26. The computer program product of claim 14, wherein identifying additional profiles that demonstrate a likely interest in the new defined community comprises:
crawling the social network for additional profiles; and
identifying a match between entries in each additional profile and concepts in one or more concept clusters.

27. A computer-implemented method of generating a new defined community of users in a social network, comprising:
storing a plurality of user profiles in a social network, each user profile including a plurality of entries associated with a corresponding user;
identifying at least one concept cluster from the entries of a plurality of the user profiles;
automatically creating the new defined community associated with the concept cluster in the absence of user communication about the new defined community, wherein the new defined community associated with the concept cluster does not already exist in the social network, is distinct from other existing communities in the social network, and is distinct from identities of members of the new defined community; and
inviting each user profile having entries that match the concept cluster to join the new defined community.

28. A computer program product having a computer-readable medium having computer program instructions embodied therein for generating a new defined community of users in a social network, the computer program product comprising computer program instructions for:
storing a plurality of user profiles in a social network, each user profile including a plurality of entries associated with a corresponding user;
identifying at least one concept cluster from the entries of a plurality of the user profiles;
automatically creating a new community associated with the concept cluster in the absence of user communication about the new defined community, wherein the new defined community associated with the concept cluster does not already exist in the social network, is distinct from other existing communities in the social network, and is distinct from identities of members of the new defined community; and
inviting each user profile having entries that match the concept cluster to join the new defined community.

* * * * *